US008156720B2

(12) United States Patent
Daraie et al.

(10) Patent No.: US 8,156,720 B2
(45) Date of Patent: Apr. 17, 2012

(54) GRAPPLE APPARATUS FOR HANDLING COTTON MODULES

(75) Inventors: Shadruz Daraie, Copley, OH (US); Robert Sikorski, Tallmadge, OH (US)

(73) Assignee: Paladin Brands Group, Inc., Cedar Rapids, IA (US)

( * ) Notice: Subject to any disclaimer, the term of this patent is extended or adjusted under 35 U.S.C. 154(b) by 263 days.

(21) Appl. No.: 12/475,921

(22) Filed: Jun. 1, 2009

(65) Prior Publication Data
US 2009/0297325 A1 Dec. 3, 2009

Related U.S. Application Data

(60) Provisional application No. 61/057,999, filed on Jun. 2, 2008.

(51) Int. Cl.
*B66C 1/42* (2006.01)
(52) U.S. Cl. ........ 53/492; 53/381.2; 294/86.4; 294/104; 19/35; 19/38; 19/65 R; 209/552; 414/225.01
(58) Field of Classification Search .................... 53/492, 53/381.2; 294/86.4, 104; 19/35, 38, 65 R; 209/552; 414/225.01
See application file for complete search history.

(56) References Cited

U.S. PATENT DOCUMENTS

| 2,706,061 A | 4/1955 | Ehmann |
| 2,775,359 A | 12/1956 | Carpenter |
| 3,241,695 A | 3/1966 | Bishop |
| 4,161,253 A | 7/1979 | Ralston et al. |
| 4,676,289 A | 6/1987 | Yi Su |
| 4,794,671 A | 1/1989 | Goldman |
| 4,821,486 A | 4/1989 | Oiestad |
| 4,929,141 A * | 5/1990 | Keesey et al. ................ 414/412 |
| 5,033,683 A * | 7/1991 | Taylor ........................ 241/101.2 |
| 5,071,079 A * | 12/1991 | Fykse et al. ................ 241/186.4 |

(Continued)

FOREIGN PATENT DOCUMENTS
ES 2 101 662 A1 7/1997
(Continued)

OTHER PUBLICATIONS

International Search Report mailed Jul. 21, 2009 for International application No. PCT/US2009/045830.

(Continued)

*Primary Examiner* — Hemant M Desai
(74) *Attorney, Agent, or Firm* — Fay Sharpe LLP (57) ABSTRACT

A grapple apparatus for handling cotton modules includes a frame comprising first and second portions. The second portion is selectively movable relative to the first portion between an opened position and a closed position. The frame defines a module-holding space when the second portion of the frame is in its closed position. At least one powered roller device is connected to the frame and is selectively active to rotate an associated cotton module located in the module-holding space relative to said frame about a module axis of rotation. A method for handling cotton modules includes positioning a frame adjacent a cotton module and moving a second portion of the frame relative to a first portion of the frame from an opened position to a closed position to define a module-holding space in which the cotton module is received and retained. The method further includes activating at least one powered roller device that is connected to the frame to rotate the cotton module in the module-holding space relative to the frame about an axis of rotation.

14 Claims, 6 Drawing Sheets

U.S. PATENT DOCUMENTS

| | | | |
|---|---|---|---|
| 5,079,898 A * | 1/1992 | Springs et al. | 53/399 |
| 5,311,729 A * | 5/1994 | Viaud | 56/341 |
| 5,318,399 A | 6/1994 | Marom | |
| 5,327,706 A | 7/1994 | Skole | |
| 5,638,749 A * | 6/1997 | Ansbjer et al. | 100/87 |
| 6,901,732 B2 | 6/2005 | Bares et al. | |
| 6,941,740 B2 | 9/2005 | Fox et al. | |
| 7,165,928 B2 | 1/2007 | Haverdink et al. | |
| 7,182,568 B2 | 2/2007 | McGinnes | |
| 7,591,628 B2 | 9/2009 | Noonan et al. | |
| 7,785,057 B2 * | 8/2010 | Noonan et al. | 414/412 |
| 2003/0019345 A1 | 1/2003 | Platon et al. | |
| 2003/0089081 A1 | 5/2003 | Platon | |
| 2005/0105990 A1 | 5/2005 | Maclay | |
| 2005/0200457 A1 | 9/2005 | Bridgelall et al. | |
| 2005/0207877 A1 | 9/2005 | Haverdink et al. | |
| 2007/0181469 A1 | 8/2007 | Stover | |
| 2008/0063503 A1 | 3/2008 | Garrett | |
| 2008/0121119 A1 * | 5/2008 | Routledge | 100/5 |
| 2009/0108606 A1 * | 4/2009 | Noonan et al. | 294/104 |
| 2010/0111647 A1 | 5/2010 | Noonan et al. | |

FOREIGN PATENT DOCUMENTS

| | | |
|---|---|---|
| GB | 2 101 882 A1 | 1/1983 |
| WO | WO 2006/118469 A1 | 11/2006 |

OTHER PUBLICATIONS

Written Opinion mailed Jul. 21, 2009 for International application No. PCT/US2009/045830.

* cited by examiner

GRAPPLE APPARATUS FOR HANDLING COTTON MODULES

CROSS-REFERENCE TO RELATED APPLICATIONS

This application claims priority from and benefit of the filing date of U.S. provisional application Ser. No. 61/057,999 filed Jun. 2, 2008, and the entire disclosure of said provisional application Ser. No. 61/057,999 is hereby expressly incorporated by reference into the present specification.

BACKGROUND

A need has been identified for an improved apparatus for handling large cylindrical bales or modules of cotton using a front-end loader or other loader machine. The cotton modules are typically large cylindrical packages of cotton, covered in an external polymeric wrap. Known devices have not allowed for optimal handling of the cylindrical modules and have also been deemed deficient for unloading the cotton and for removing and handling the polymeric wrap during unloading of the cotton from the module into an associated receiving location such as a ginning apparatus or other location.

SUMMARY

In accordance with one aspect of the present development, a grapple apparatus for handling cotton modules includes a frame comprising first and second portions. The second portion is selectively movable relative to the first portion between an opened position and a closed position. The frame defines a module-holding space when the second portion of the frame is in its closed position. At least one powered roller device is connected to the frame and is selectively active to rotate an associated cotton module located in the module-holding space relative to said frame about a module axis of rotation.

In accordance with another aspect of the present development, a method for handling cotton modules includes positioning a frame adjacent a cotton module and moving a second portion of the frame relative to a first portion of the frame from an opened position to a closed position to define a module-holding space in which the cotton module is received and retained. The method further includes activating at least one powered roller device that is connected to the frame to rotate the cotton module in the module-holding space relative to the frame about an axis of rotation.

DETAILED DESCRIPTION

Figure 1:
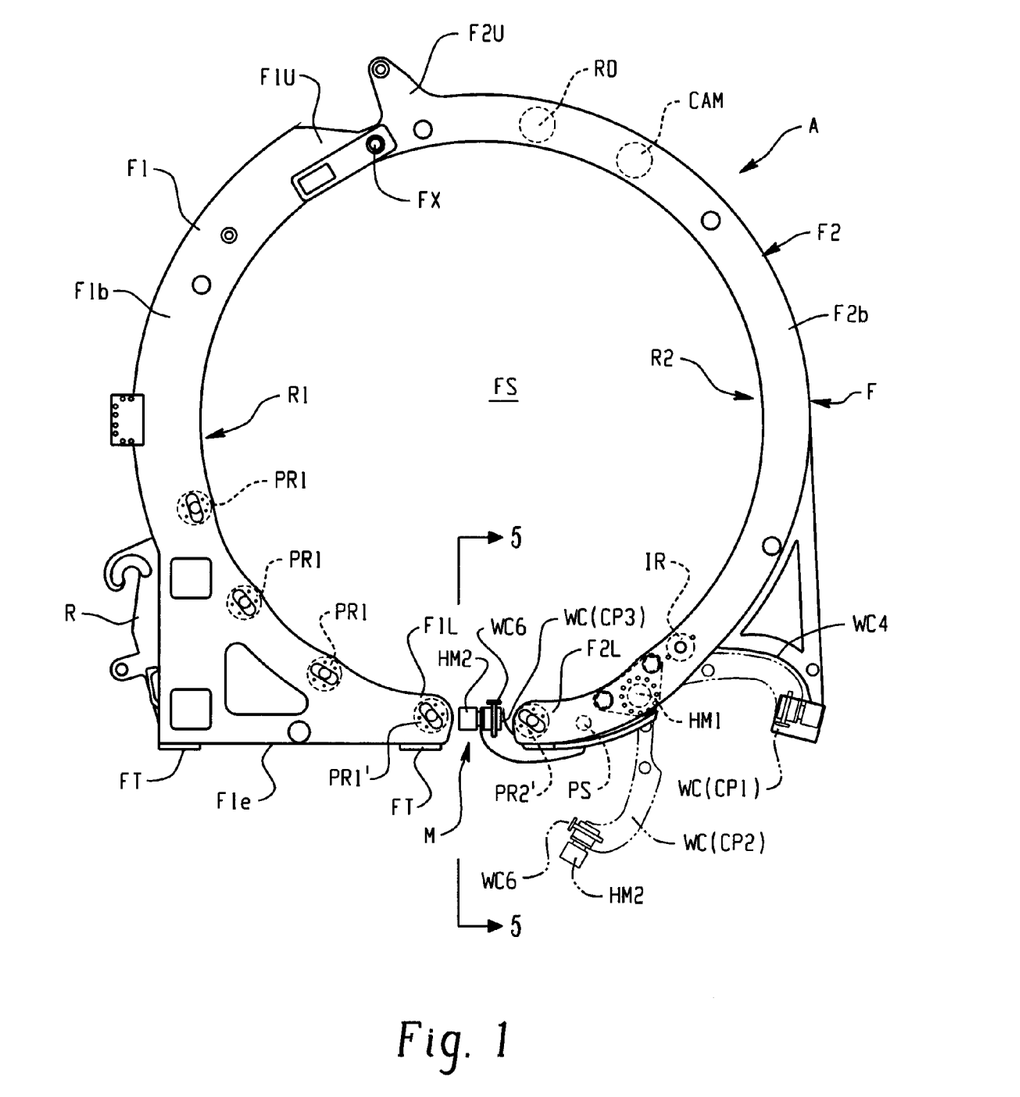
FIG. 1 is a side view of a grapple apparatus for handling a cotton bales/modules.
Figure 2:
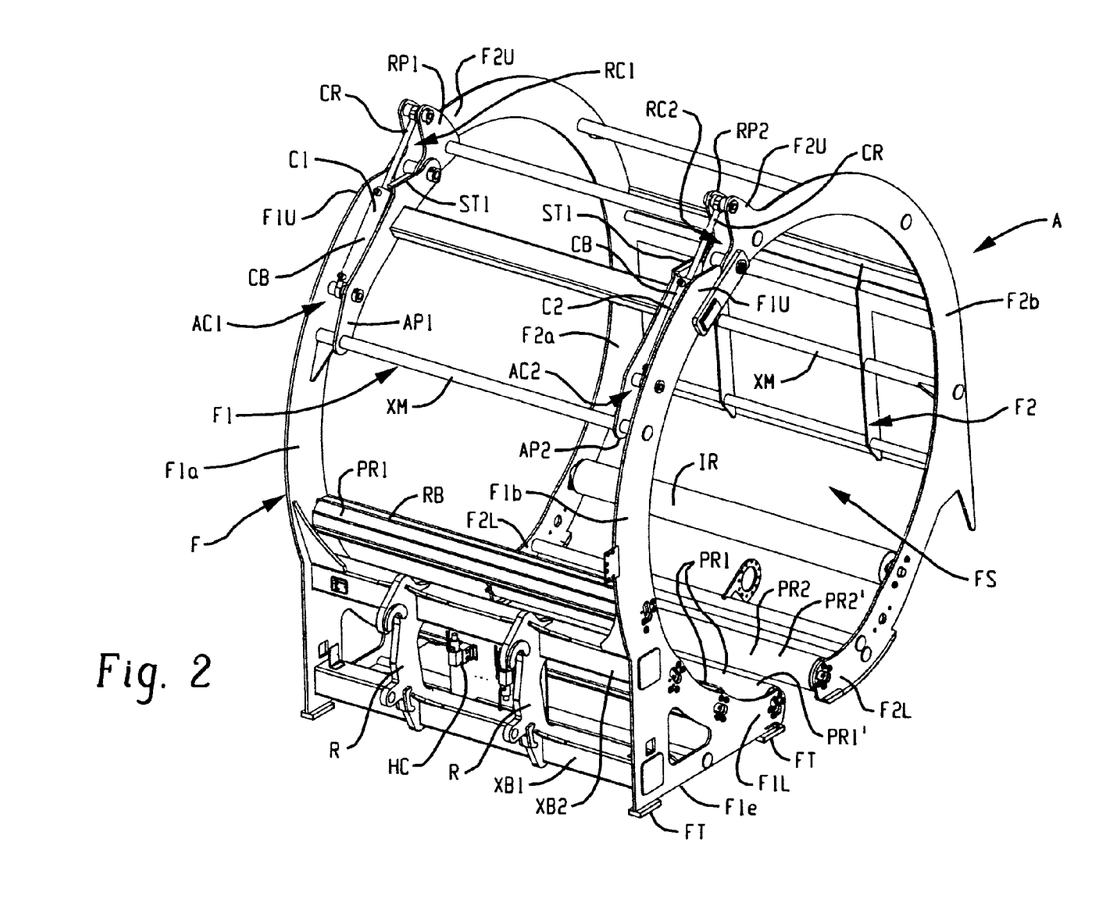
FIG. 2 is a rear isometric view of a frame portion of the grapple apparatus.
Figure 3:
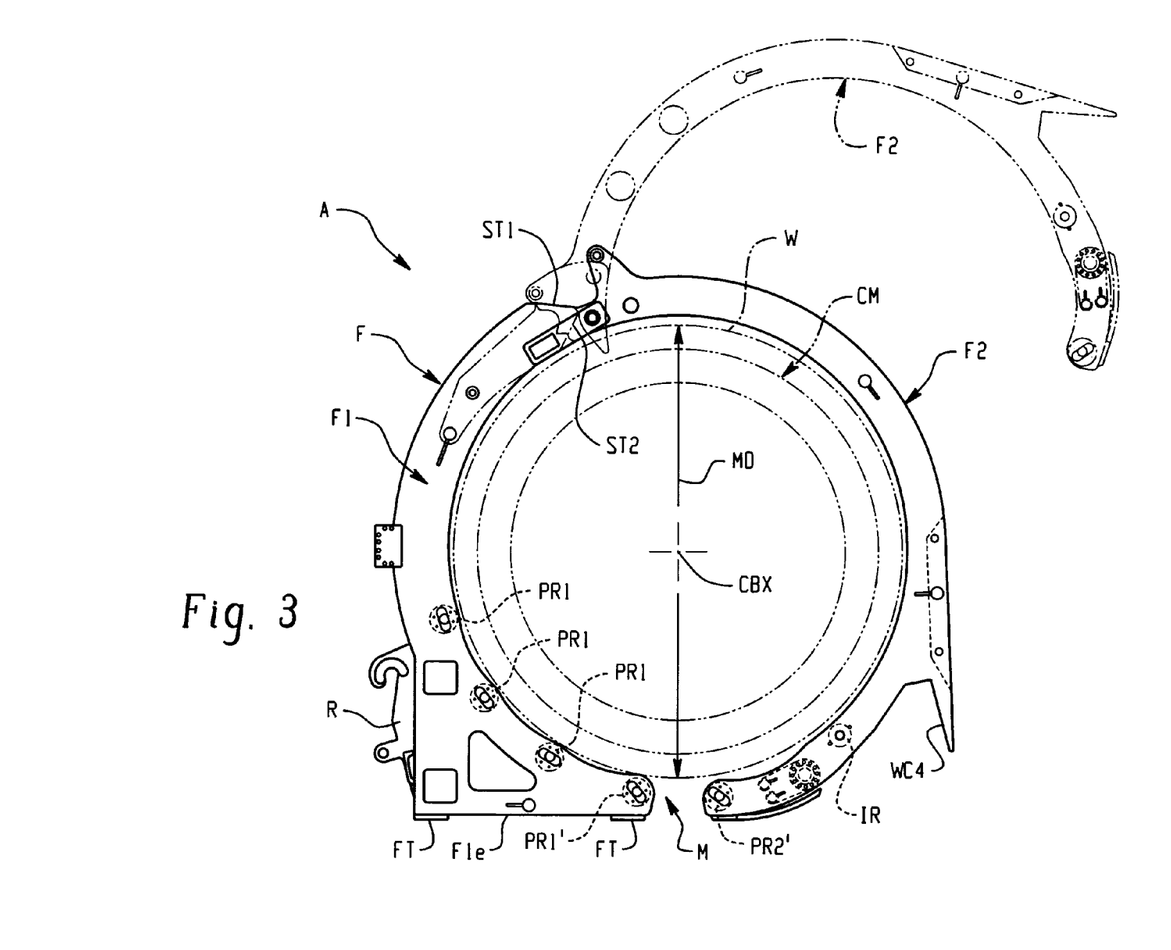
FIG. 3 is a side view of the frame of FIG. 2.

FIG. 1 is a side view of a grapple apparatus A for handling cotton bales or "modules" CM (FIG. 3), in particular, for grasping, carrying, transporting and releasing the cotton modules and/or also for selectively opening the cotton modules to release the cotton into a processing machine or other location. FIG. 2 is a rear isometric view of a frame portion F of the apparatus A (not showing a wrap cutting system WC of the apparatus A). FIG. 3 is a side view of the frame F. As is generally known in the art, cotton modules CM are large, cylindrical bales or packages of cotton C wrapped with an outer layer of polymeric film W or other protective wrap/covering.

Referring to all of FIGS. 1-3, the frame F of the grapple apparatus A is defined from steel or other metal and comprises an inner or first frame portion F1 and an outer or second frame portion F2 that is pivotally or otherwise movably connected to the first frame portion F1. The second frame portion F2 moves relative to the first frame portion F1 to and between an opened position for loading/unloading a cotton module (shown in broken lines in FIG. 3) and a closed position (shown in FIGS. 1, 2 and in solid lines in FIG. 3) for retaining and transporting and otherwise handling an associated cotton module.

The first frame portion F1 comprises or defines an outwardly (forwardly) facing concave first recess R1 (FIG. 1) and the second frame portion F2 comprises or defines an inwardly (rearwardly) facing second concave recess R2 (FIG. 2). When the second frame portion F2 is in its closed position, the first and second recesses R1,R2 are arranged in opposed facing relation and together define a module-holding space FS for receiving and retaining an associated cotton module CM. The module-holding space FS allows a cylindrical module to be held therein and rotated as described below. When the second frame portion F2 is opened relative to the first frame portion F1 as shown in broken lines in FIG. 3, the module-holding space FS is opened and a cotton module CM held in the space FS is released from (or a new cotton module CM is able to be loaded into) the space FS. In an alternative embodiment, the first frame portion F1 moves relative to the second frame portion F2 and/or both frame portions F1,F2 move relative to each other to open and close the module-holding space FS.

In the illustrated embodiment, the first frame portion F1 comprises first and second side walls F1a,F1b including respective lower ends F1L and respective upper ends F1U. Likewise, the second frame portion F2 comprises first and second side walls F2a,F2b including respective lower ends F2L and respective upper ends F2U. The upper ends F2U of the first and second side walls F2a,F2b of the second frame portion F2 are pivotally connected respectively to the upper ends F1U of the first and second side walls F1a,F1b of the first frame portion F1. As such, the second frame portion F2 pivots relative to the first frame portion F1 about a horizontal pivot axis FX.

One or more frame actuators C1,C2 are operably connected between the first and second frame portions F1,F2 adjacent the pivoting connections therebetween and are selectively activated to move the second frame portion F2 between its opened and closed positions relative to the first frame portion F1 without obstructing the module-receiving space FS in any position of the second frame portion F2. In the illustrated embodiment, the actuators C1,C2 comprise hydraulic cylinders each including a body CB mounted at the upper end F1U of one of the side walls F1a,F2b and a selectively extensible rod CR connected to a corresponding upper end F2U of one of the side walls F2a,F2b (or vice versa) such that extension of the rods CR pivots the second fame portion F2 from its opened position to its closed position, and retraction of the rods CR pivots the second frame portion F2 from its closed position to its opened position. As shown, the first frame portion F1 comprises first and second actuator mounting channels AC1,AC2 defined between the first and second side walls F1a,F1b first and second actuator mounting plates AP1,AP2 that are spaced inwardly from and arranged parallel to the first and second side walls F1a,F1b,respectively. The cylinder bodies CB of the actuators C1,C2 are mounted respectively in the actuator mounting channels AC1,AC2, each connected to the sidewall F1a,F1b and actuator mounting plate AP1,AP2 defining the relevant actuator mounting channel. Similarly, the second frame portion F2 comprises first and second rod connection channels RC1,RC2 defined between the first and second side walls F2a,F2b and first and second rod connection plates RP1,RP2 that are spaced inwardly from and arranged parallel to the first and second side walls F2a,F2b,respectively. The cylinder rods CR of the actuators C1,C2 are located respectively in the rod connection channels RC1,RC2, each connected to the sidewall F2a, F2b and rod connection plate RP1,RP2 defining the relevant rod connection channel.

Preferably, when the second frame portion F2 is fully opened, the sidewalls F2a,F2b and/or the rod connection plates RP1,RP2 and/or other parts of the second frame portion F2 contact opening stops ST1 of the first frame portion F1. When the second frame portion F2 is fully closed, the sidewalls F2a,F2b and/or the rod connection plates RP1,RP2 and/or other parts of the outer frame portion F2 contact closing stops ST2 (FIG. 3) of the first frame portion F1. As shown these opening and closing stops ST1,ST2 are connected to the actuator mounting plates AP1,AP2.

The respective lower ends F1L,F2L of the first and second frame portions F1,F2 define therebetween a mouth M that communicates with the module-holding space FS. When the second frame portion F2 is in its closed position to define the module-holding space FS, the mouth M is opened a distance that is less than a maximum diameter MD of the cotton module CM and, preferably, the distance is less than 25% of the maximum diameter MD of the cotton module CM. The second frame portion F2 and the module-holding space FS are deemed to be "opened" if the mouth M is opened a distance that is greater than the maximum diameter MD of the cotton module CM such that the cotton module can move through the mouth M into/out of the space FS. When the second frame portion F2 and the module-holding space FS are "closed" the frame F extends about or encircles at least 75 percent of a circumference of the associated cotton module CM located in the module-holding space FS. It should be noted that the opposite lateral ends of the module-holding space FS (adjacent the side walls F1a,F2a and F1b,F2b) are opened when the second portion F2 of the frame F is in its closed position.

The frame F is adapted to be carried by a wheel loader or other loader machine (hereinafter "loader" or "loader machine"). In particular, the first frame portion F1 is adapted to be connected to the loader by suitable means such as a pin-on connection or, as shown, by a quick-coupler apparatus. In the illustrated embodiment, the first frame portion F1 comprises a pair of quick-coupler ribs R or other coupling structure adapted to be mated with and secured to a corresponding quick-coupler or "master" that is pivotally pinned to the associated loader. The first fame portion F1 comprises first and second parallel, spaced-apart cross-bars XB1,XB2 that extend between and interconnect the side walls F1a,F1b. Both the inner and outer frame portions F1,F2 are defined as open, skeletal structures, with other various cross-members XM and the like. The side walls F1a,F1b of the inner frame portion F1 include bottom edges F1e that are conformed to define a base, e.g., with feet FT to support the grapple apparatus A on a floor other support surface when not in use.

The first frame portion F1 further includes one or more powered roller devices PR1 that are horizontally arranged parallel to each other and that extend between the first and second side walls F1a,F1b at spaced intervals, with all or at least one/some of the powered roller devices PR1 being located below a mid-point between the lower and upper ends F1L,F1U of the sidewalls F1a,F1b (i.e., closer to the lower ends F1L as compared to the upper ends F1U and below the vertical level of a central longitudinal axis CMX of the cotton module CM) so that a cotton module CM carried in the module-receiving space FS will contact and be urged against at least one and preferably all of the powered roller devices PR1 by force of gravity. Each powered roller device PR1 is selectively rotatable by electric or hydraulic power about a horizontal roller axis that extends perpendicularly between the side walls F1a,F1b and parallel to the cotton module axis CMX. Rotation of the powered roller device(s) PR1 will cause the cotton module CM to be rotated about its axis CMX, i.e., the central longitudinal axis CMX defines an axis of rotation for the cotton module CM.

Similarly, the second frame portion F2 includes at least one powered roller device PR2 that is horizontally arranged parallel to the powered roller(s) PR1 of the first frame portion F1 and that extend(s) between the first and second side walls F2a,F2b. Each powered roller device PR is selectively rotatable by electric or hydraulic power about a horizontal axis that extends perpendicularly between the side walls F2a,F2b and parallel to the cotton module longitudinal axis CMX. The only (as shown) or at least one powered roller device PR2 is located below a mid-point between the lower and upper ends F2L,F2U of the sidewalls F2a,F2b (i.e., closer to the lower ends F2L as compared to the upper ends F2U and below the vertical level of the module axis CMX) so that a cotton module CM carried in the module-receiving space FS will contact and be urged against the least one powered roller device PR2 by force of gravity. Preferably, the first frame portion F1 and/or second frame portion F2 further comprises at least one idler roller IR that extends between the sidewalls F2a,F2b parallel to the powered roller(s) PR1/PR2 and that is freely rotatable about a horizontal axis parallel to the axis of rotation of the powered roller device PR2 to facilitate rotation of a cotton module CM in the module-holding space FS as described herein.

Preferably, at least a lowermost powered roller device PR1 of the first frame portion F1 is included and located adjacent the lower ends F1L of the side walls F1a,F1b and is referred to as a first or inner primary powered roller PR1'. Likewise, preferably at least one powered roller device PR2 (or the only powered roller device PR2) of the outer frame portion F2 is located adjacent the lower ends F2L of the sidewalls F2a,F2b and is referred to as a second or outer primary powered roller PR2'. The first (inner) and second (outer) primary powered roller devices PR1',PR2' are located on opposite sides of the mouth M. Except for these primary inner and outer powered roller devices PR1',PR2', which preferably include selectively extensible studs as described below, the powered roller devices PR1,PR2 can be smooth or can include a textured outer surface such as axially extending ribs RB (FIG. 2) projecting outwardly therefrom to improve the ability of the powered roller devices to engage and rotate a cotton module CM held in the module-receiving space FS. Also, the outer surface of each powered roller device PR1,PR2 (including the inner and outer primary powered roller devices PR1',PR2') can include or be defined from an elastomeric material to improve fiction between the powered roller device PR1,PR2 and the wrap W of the cotton module CM held in the module-receiving space FS. It is possible that the grapple apparatus A include only a single powered roller device, in which case the single powered roller device would preferably be either one of the primary inner and outer powered roller devices PR1',PR2'.

Figure 4:
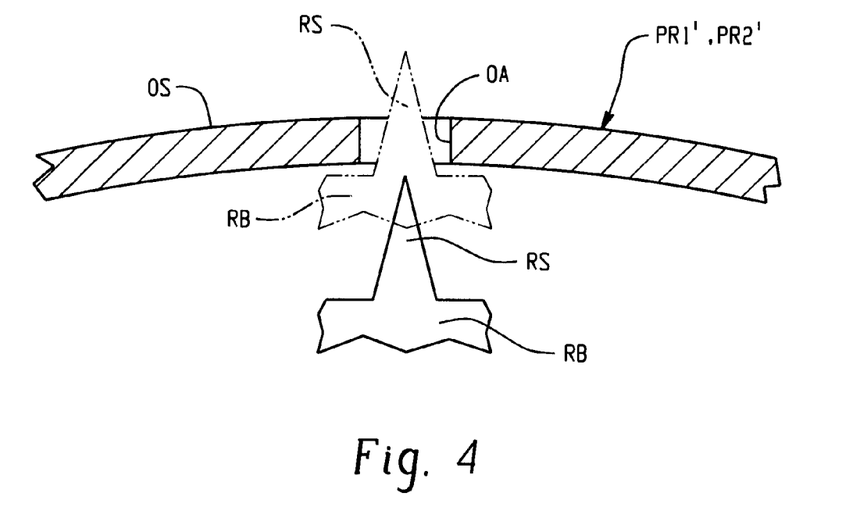
FIGS. 4 and 4A are diagrammatic views of the extensible studs of the powered roller devices.
Figure 4A:
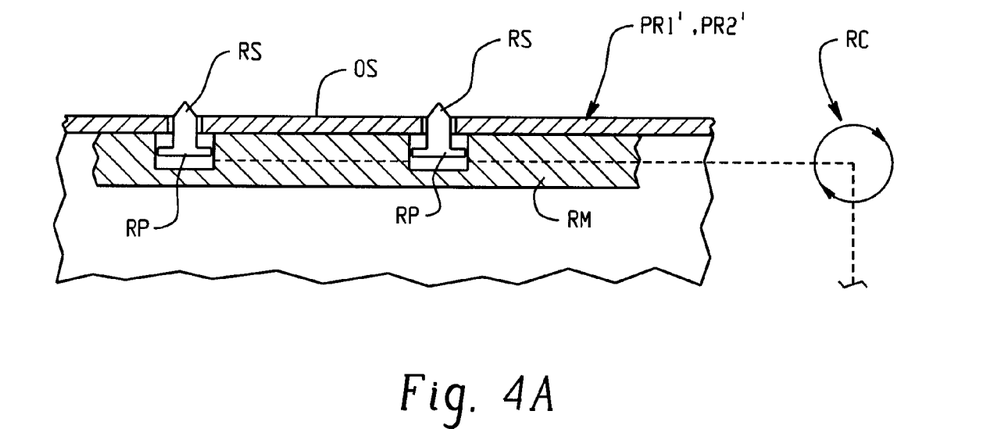

Referring now to FIG. 4, at least one and preferably both of the primary inner and outer powered roller devices PR1',PR2' (optionally, additionally/alternatively the other powered roller devices PR1,PR2) include a plurality of studs RS that are selectively extensible from and retractable relative to an outer surface OS of the primary powered roller device PR1', PR2'. The studs RS are preferably distributed around the circumference and across the width of outer surface OS. In the illustrated embodiment, the outer surface OS includes a plurality of apertures OA and the studs RS are selectively extensible from the apertures OA to project outwardly from the outer surface OS and are selectively retractable into the apertures OA so as to be flush with or recessed relative to the outer surface OS. In the illustrated embodiment, the studs RS are mounted on a base RB and the base is selectively moved radially inward and outward relative to the outer surface OS by an electric and/or hydraulic actuator to control the radial extension of the studs RS connected to the base RB. For example, each primary powered roller device PR1',PR2' can include multiple rows of studs RS, with each row of studs connected to a separate base RB for selective extension and retraction relative to the outer surface OS. In another example, as shown in FIG. 4A, a hydraulic manifold RM is connected to rotate with the powered roller device PR1',PR2' and comprises a plurality of reciprocal pistons RP that are selectively extensible and retractable by force of hydraulic or other fluid pressure. Each stud RS is connected to one of the pistons RP and moves therewith. Hydraulic fluid is supplied to/from the manifold RM through a rotatable (swivel) coupling RC.

Figure 5:
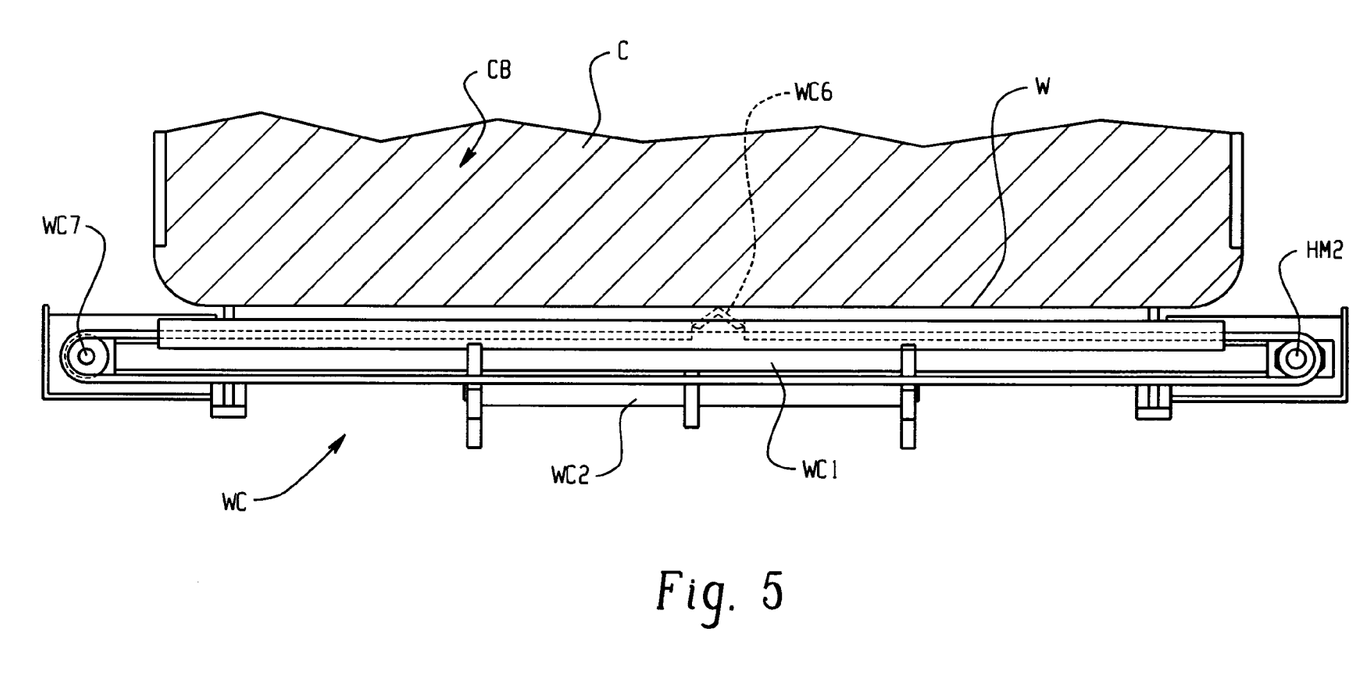
FIG. 5 is a view as taken along view line 5-5 of FIG. 1, and also partially shows a cotton module held in the module-receiving space.

FIG. 5 is a view as taken along view line 5-5 of FIG. 1, and also partially shows a cotton module CM held in the module-receiving space FS. Referring to both FIGS. 1 and 5, the grapple apparatus A further comprises a wrap cutting system WC for cutting the cotton module protective wrap W when desired to release the cotton C from the module CM into a processing machine or other location. The wrap cutting system WC comprises a wrap cutter WC1 carried by a movable cutter arm WC2 that selectively moves the wrap cutter WC1 between an operative and a storage position. In the illustrated embodiment, the cutter arm WC2 is pivotally connected to the second frame portion F2 and is pivotable from a storage position (shown in broken lines at CP1) to an operative cutting position (shown in solid lines at CP3, and shown in FIG. 5) through an intermediate position (shown in broken lines at CP2). In the storage position the cutter arm WC2 and the wrap cutter WC1 carried thereby are nested in a protective cutter storage recess WC4 defined by the second frame portion F2. In the operative position, the cutter arm WC2 is pivoted to move the wrap cutter WC1 into a cutting space located adjacent in the mouth M defined between the inner and outer primary rollers PR1',PR2', where the wrap cutter WC1 can slit the polymeric wrap W of the cotton module CM. An actuator such as a cylinder or a hydraulic (or electric) motor HM1 is connected to the second frame portion F2 and operatively connected to the cutter arm WC2 for driving the cutter arm WC2 to and between its storage and operative positions.

The wrap cutter WC1, itself, can take any of a wide variety of forms. In the illustrated embodiment, the wrap cutter WC1 comprises an actuator such as a cylinder or a hydraulic motor HM2 mounted on the cutter arm WC2 and drivingly connected to a cutting blade WC6 by a chain drive system WC7 so that actuation of the hydraulic motor HM2 drives the blade WC6 across the face of the cotton module CM along an axis parallel to the module longitudinal axis CMX.

A cotton module CM carried in the module-receiving space FS can be selectively rotated in either a clockwise or counter-clockwise direction about its longitudinal axis CMX (FIG. 3), which thus defines an axis of rotation that is parallel to the axis of rotation of each powered roller device PR1,PR2 and idler roller IR, by operation of the powered roller devices PR1,PR2 (including the inner and outer primary powered roller devices PR1',PR2'). The axis of rotation CMX of the cotton module CM is parallel to the frame pivot axis FX. During rotation of the cotton module CM, the studs RS of the inner/outer primary powered roller devices PR1',PR2' are retracted so as not to engage the cotton module CM. When the cotton module CM is rotated to the desired position, the cutter arm WC2 is pivoted from its storage position CP1 to its operative position CP3 so that the wrap cutter WC1 is located in the cutting space defined in the mouth M between the inner and outer primary powered roller devices PR1',PR2'. The wrap cutter WC1 is the activated by the hydraulic motor HM2 to slit the polymeric wrap W of the cotton module axially (parallel to the axis CMX of the module CM). After the module wrap W is slit, the cutter arm WC2 is moved back to its storage position by the hydraulic motor HM1, and the studs RS of the inner and outer primary powered rollers PR1',PR2' are extended. The inner and outer primary powered rollers PR1',PR2' are then rotated in opposite directions relative to each other, with the upper portions thereof that are in contact with the cotton module CM moving inward toward each other, while the second frame portion F2 is moved in a controlled fashion from its closed position to its opened position so that the cotton contents C of the module CM is slowly released from the space FS while the wrap W is retained by and wound about the inner and outer primary powered rollers PR1',PR2'. After release of the cotton contents C from the unwrapped cotton module CM, the polymeric module wrap W is removed from the inner and outer primary powered rollers PR1',PR2' manually and/or by reversing the inner and outer primary powered rollers PR1',PR2' and/or by retracting the studs RS. It should be noted that the wrap cutting system WC can be omitted, in which case the protective wrap W of the module must be manually slit, e.g., in the mouth M located between the inner and outer primary powered rollers Referring again specifically to FIG. 2, the grapple apparatus A comprises suitable components such as hydraulic valves and manifolds HC connected to the first frame portion F1 for controlling the hydraulic cylinders C1,C2, powered rollers PR1,PR2, hydraulic motors HM1,HM2 and any other hydraulic components. Hydraulic fluid is fed to the hydraulic valves and manifolds HC of the grapple apparatus A from the associated loader machine to which the grapple apparatus A is operatively connected using known arrangements of hoses, valves, manifolds, and the like. Electrical plugs, connectors and other means for delivering and controlling electrical power to the grapple apparatus A are optionally provided as needed.

Figure 6:
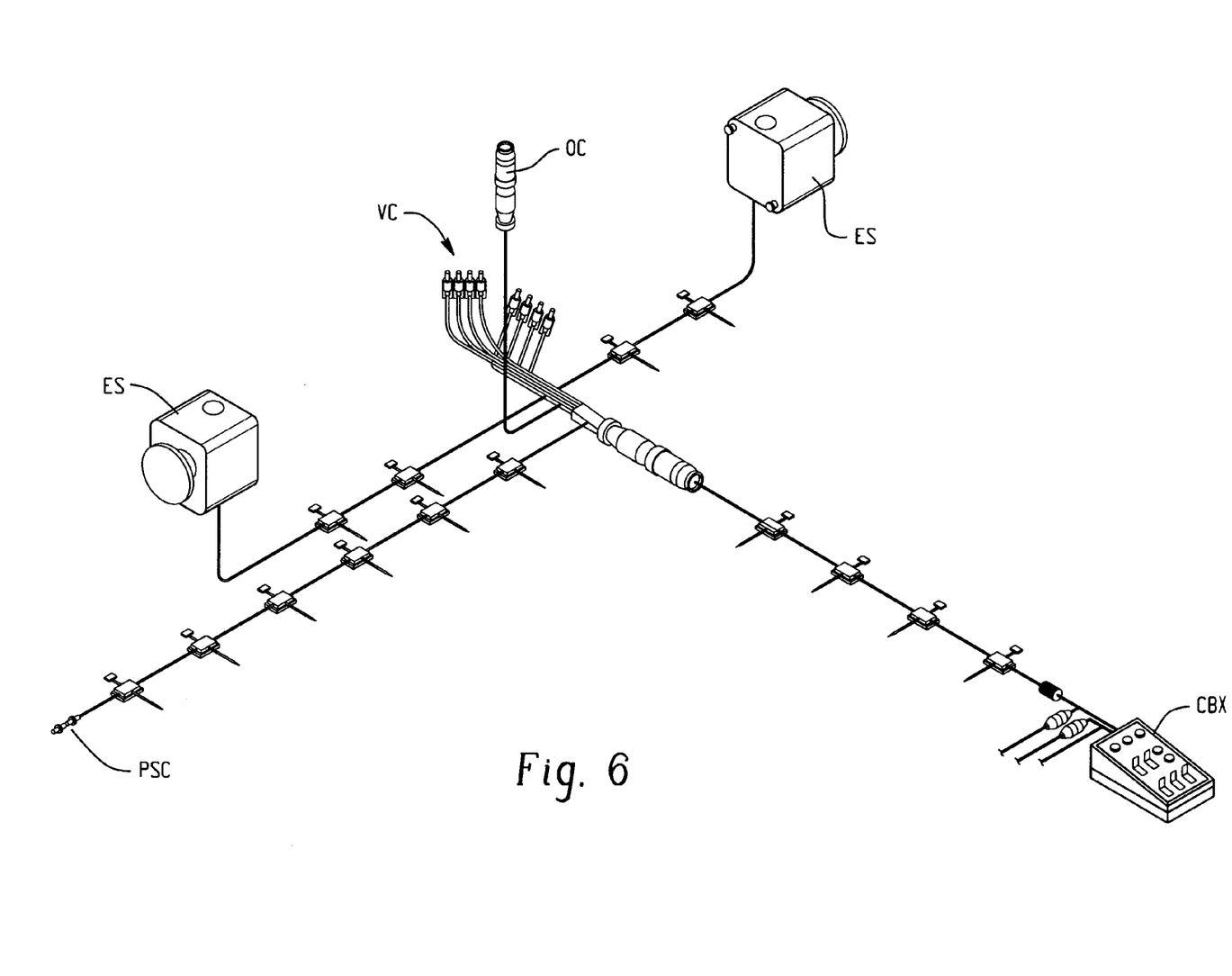
FIG. 6 shows one example of an electrical system for controlling the grapple apparatus.

FIG. 6 shows one example of an electrical system for controlling the grapple apparatus A. The control box CBX is mounted in the operator's cab of the loader to which the grapple apparatus A is operably connected for use by an operator to control all aspects of the grapple apparatus A. The control box CBX, includes relays, microprocessors, switches, and/or other electrical devices and circuits for receiving electrical input signals from and providing electrical output signals to the grapple apparatus A to control all operational aspects thereof. For example, a plurality of valve connectors VC are provided for electrical connection to the hydraulic valves/manifolds HC of the grapple apparatus A to control the operation thereof (and thus control flow of hydraulic fluid) via signals sent from the control box CBX. The grapple apparatus A can include one or more emergency stop switches/sensors ES connected to the frame F or elsewhere as desired. Activation of the emergency stop switch/sensor ES will cut all electrical, hydraulic or other power to the apparatus A to halt any movement of the outer frame portion F2 and/or to halt any activation of the powered roller devices PR1,PR2. The grapple apparatus A optionally further includes at least one radio frequency identification (RFID) transceiver/reader RD (FIG. 1) connected to the frame F for sensing any RFID tag on the cotton module CM carried in the module-receiving space FS, and the RFID transceiver/reader RD is electrically connected through an optional component connector OC to the control box CBX and/or other parts of the loader machine to provide an output signal to the control box CBX and/or other location of the loader machine and/or by a wireless connection to a remote RFID receiver. The frame F can also include an optional camera CAM mounted thereto for viewing the module CM carried in the space FS and/or for operator viewing of the loading/unloading zones and associated cotton modules CM. The camera CAM is also electrically connected to the control box CBX and/or other associated components of the loader through an optional component connector OC. The apparatus A can further optionally include a proximity switch or sensor PS connected to the frame F (as shown in FIG. 1) or cutter arm WC2 for sensing the position of the cutter arm. The proximity switch PS connects to the control box CBX through a proximity switch connector PSC.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A grapple apparatus for handling cotton modules, said grapple apparatus comprising:
    a frame comprising first and second portions, said second portion selectively movable relative to the first portion between an opened position and a closed position, said frame defining a module-holding space when said second portion of said frame is in its closed position;
    at least one powered roller device connected to said frame and selectively active to rotate an associated cotton module located in said module-holding space relative to said frame about a module axis of rotation; and,
    first and second parallel spaced-apart ribs connected to said first portion of said frame and adapted to mate with a quick-coupler carried by an associated loader machine such that said grapple apparatus is selectively carried by the associated loader machine;
    a cutter arm movably connected to the frame, said cutter arm movable between a storage position and an operative cutting position;
    a cutter arm actuator operatively connected to the cutter arm for selectively moving said cutter arm to and between its storage and cutting positions;
    a wrap cutter connected to said cutter arm;
    a wrap cutter actuator operatively connected to the wrap cutter for selectively moving the wrap cutter along a cutting path to cut a wrap located on the associated cotton module when said cutter arm is located in its cutting position.

2. The grapple apparatus as set forth in claim 1, wherein said frame extends about at least 75 percent of a circumference of the associated cotton module located in said module-holding space when said second portion of said frame is located in its closed position.

3. The grapple apparatus as set forth in claim 2, wherein said powered roller device is located at a first vertical height and said module axis of rotation is located at a second vertical height that is higher than said first vertical height.

4. The grapple apparatus as set forth in claim 3, wherein said at least one powered roller device comprises:
    a first primary powered roller device connected to the first frame portion;
    a second primary powered roller device connected to the second frame portion.

5. The grapple apparatus as set forth in claim 4, wherein the frame defines said module-holding space to have an open mouth defined between opposed ends of the first and second frame portions when said second portion of the frame is in its closed position, wherein said first and second primary powered roller devices are located adjacent said open mouth and on opposite sides of said open mouth when said second portion of said frame is located in its closed position.

6. The grapple apparatus as set forth in claim 4, wherein at least one of said first and second frame portions includes at least one idler roll that is freely rotatable in first and second directions about a respective idler roll axis of rotation that is parallel to the module axis of rotation.

7. The grapple apparatus as set forth in claim 4, wherein:
    said first and second frame portions comprise respective first and second lateral side walls, and
    said first and second primary powered roller devices extends laterally between the first and second side walls of the first and second frame portions, respectively.

8. The grapple apparatus as set forth in claim 7, wherein the respective first side walls of the first and second frame portions are pivotally connected, and wherein the respective second side walls of the first and second frame portions are pivotally connected, and wherein said grapple apparatus further comprises at least one frame actuator operatively connected between the first and second frame portions for selectively pivoting the second frame portion relative to the first frame portion between its opened and closed positions.

9. The grapple apparatus as set forth in claim 5, wherein at least one of the first and second primary powered roller devices includes selectively extensible studs that project outwardly from an outer surface when the studs are extended and that are refracted relative to the outer surface when the studs are retracted.

10. The grapple apparatus as set forth in claim 5, wherein said cutting path lies in said open mouth of said module-holding space and extends parallel to the module axis of rotation.

11. The grapple apparatus as set forth in claim 10, wherein said cutter arm is pivotally connected to said movable second frame portion.

12. The grapple apparatus as set forth in claim 9, wherein both the first and second primary powered roller devices include selectively extensible studs that project outwardly from their respective outer surfaces when the studs are extended and that are retracted relative to the respective outer surfaces when the studs are retracted.

13. The grapple apparatus as set forth in claim 1, further comprising at least one of a camera and an RFID transceiver connected to the frame.

14. A method for handling cotton modules, said method comprising:
   using a loader machine to move a grapple apparatus adjacent a cotton module;
   positioning a first portion of a frame of the grapple apparatus adjacent the cotton module and moving a second portion of the frame relative to a first portion of the frame from an opened position to a closed position to define a module-holding space in which the cotton module is received and retained;
   transporting the cotton module to a cotton receiving location of a ginning apparatus and activating at least one powered roller device that is connected to the frame to rotate the cotton module in the module-holding space relative to the frame about an axis of rotation;
   moving a cutter arm that is connected to the frame from a storage position to an operative cutting position; and,
   slitting a polymeric wrap of the cotton module located in the module-holding space by actuating a wrap cutter that is connected to the cutter arm;
   after said slitting step, moving the cutter arm from the operative cutting position to the storage position;
   moving the second frame portion from the closed position to the opened position;
   winding the polymeric wrap onto the powered roller device by operating the powered roller device as the second frame portion is moved from its closed position to its opened position while contents of the cotton module are released from the module-holding space;
   wherein said step of winding the polymeric wrap onto the powered roller device comprises extending a plurality of studs from an outer surface of the powered roller device.

* * * * *